(12) United States Patent
Mitchell et al.

(10) Patent No.: US 7,954,791 B2
(45) Date of Patent: *Jun. 7, 2011

(54) FINE BUBBLE AIRLIFT DEVICE

(75) Inventors: William S. Mitchell, McKenzie, TN (US); Roy Trence Johnson, McKenzie, TN (US)

(73) Assignee: Tekni-Plex, Inc., King of Prussia, NJ (US)

( * ) Notice: Subject to any disclaimer, the term of this patent is extended or adjusted under 35 U.S.C. 154(b) by 883 days.

This patent is subject to a terminal disclaimer.

(21) Appl. No.: 11/710,857

(22) Filed: Feb. 26, 2007

(65) Prior Publication Data

US 2008/0000841 A1    Jan. 3, 2008

Related U.S. Application Data

(63) Continuation-in-part of application No. 11/478,875, filed on Jun. 30, 2006, now Pat. No. 7,622,040.

(51) Int. Cl.
*B01F 3/04* (2006.01)
*C02F 1/74* (2006.01)

(52) U.S. Cl. ............... 261/120; 261/122.1; 261/124; 210/170.05; 210/220; 210/242.2

(58) Field of Classification Search ............ 210/170.01, 210/170.02, 170.05, 170.06, 170.09, 170.11, 210/242.1, 220, 242.2; 261/120, 121.1, 123, 261/124, 126, DIG. 70; 138/174

See application file for complete search history.

(56) References Cited

U.S. PATENT DOCUMENTS

| 2,722,237 | A | | 11/1955 | Rosel |
|---|---|---|---|---|
| 4,690,756 | A | | 9/1987 | Van Ry |
| 4,780,023 | A | | 10/1988 | Dalton |
| 4,906,359 | A | | 3/1990 | Cox, Jr. |
| 4,917,832 | A | | 4/1990 | Marcum et al. |
| 5,326,475 | A | | 7/1994 | Kent |
| 5,811,164 | A | | 9/1998 | Mitchell |
| 5,816,742 | A | | 10/1998 | Cordewener |
| 5,938,983 | A | | 8/1999 | Sheaffer et al. |
| 6,264,176 | B1 | * | 7/2001 | Dickman et al. ............ 210/758 |
| 6,348,147 | B1 | * | 2/2002 | Long ................... 210/242.2 |
| 2005/0061721 | A1 | * | 3/2005 | Tormaschy et al. ......... 210/241 |
| 2008/0000823 | A1 | * | 1/2008 | Mitchell et al. ............ 210/220 |

FOREIGN PATENT DOCUMENTS

| GB | 2322565 | 9/1998 |
|---|---|---|
| GB | 2407810 | 5/2005 |
| WO | 01/85623 | 11/2001 |

* cited by examiner

*Primary Examiner* — Nam X Nguyen
*Assistant Examiner* — Lucas Stelling
(74) *Attorney, Agent, or Firm* — Rissman Hendricks & Oliverio LLP

(57) ABSTRACT

The present invention relates to an aeration device for use in a liquid medium. The device includes a housing adapted to float within the medium such that a top portion thereof remains above a top surface of the medium. The housing has a bottom portion and an open side portion. The device further includes a hose affixed to the bottom portion of the housing substantially parallel to the surface of the liquid medium. The hose has a wall with a plurality of pores formed therein. The device further includes a gas-supplying pipe affixed to the hose and means for supplying a gas to the pipe such that the gas passes through the pipe and into the hose.

32 Claims, 6 Drawing Sheets

FINE BUBBLE AIRLIFT DEVICE

CROSS-REFERENCE TO RELATED APPLICATIONS

This application is a continuation-in-part of U.S. patent application Ser. No. 11/478,875, filed on Jun. 30, 2006, the disclosure of which is incorporated herein by reference.

BACKGROUND OF THE INVENTION

The present invention relates to an apparatus for aerating and circulating a liquid and, in particular, water in a pond.

Various devices exist for the introduction of air bubbles into a mass of liquid, typically water. Such devices have numerous applications which encompass areas such as aquaculture, including culturing and raising fish in controlled environments (known generally as fish farming), waste water management and the like. Other uses are generally known in the art. Such devices include what are generally known as surface aeration devices and air lift devices.

Surface aeration devices in the art use a form of paddle wheel to agitate the water near the surface thereof. This causes bubbles of ambient air to become trapped in the water, some of which are absorbed into the water. The paddles further force the aerated water away from the device and draw additional water toward the device to be aerated. Surface aerators are inefficient, requiring a large energy input relative to the volume of water aerated. They also have several moving parts which can require frequent maintenance.

Air lift devices have been known for many years and essentially operate by supplying air bubbles into water at a predetermined depth below the surface. Some of this air is absorbed into the water, which causes the water to become less dense and rise toward the surface. The rising of the water causes circulation thereof, which distributes the aerated water and brings additional water toward the device for aeration. Water is aerated in an air lift device by the use of a diffuser. Many forms of diffusers have been in existence for years and typically include a porous body through which air or another gas such as nitrogen or oxygen is forced. When the diffuser is submerged in water, the movement of gas through the device causes bubbles to emerge from the pores and into the water.

Known diffusers include ceramic dome diffusers and porous rubber hoses. However, it has been found that dome diffusers are difficult to maintain, lack durability, and are more costly to manufacture in mass production.

Porous rubber hoses have been used for aeration. However, a key objection to off-the-shelf porous rubber hoses and other porous rubber aeration products is that, after a cure period in water, the hose requires high air pressure delivery systems because the rubber particles unsatisfactorily swell in water thereby decreasing pore diameter. Decreasing pore diameter causes increased flow resistance and uneven aeration patterns in long runs of tubing become more problematic as the pipes age in their environment. Further problems associated with the manufacture of porous aeration pipe utilizing previous methods have included irregularly shaped pipe walls, inconsistent porosity, and ineffective micropore size and wall thickness producing inconsistent and unreliable aeration rates.

Porous hoses are available which are made from thermoformable polymeric material, such as polyvinyl chloride (PVC) and polyethylene (PE). These types of porous hoses are formed by dispersing air bubbles into the thermoformable material while in a molten state, thereby forming a foam-like material which is then extruded into the shape of a hose, leaving the air bubbles therein when the structure freezes. In such a structure, some of the air bubbles will create pores which extend from the inside of the hose structure to the outside thereof, providing a path for gas to diffuse into water outside the hose. However, the air bubbles are irregularly distributed throughout the body of the hose, leading to irregular size and placement of the pores. For example, some air bubbles may be completely contained within the wall of the hose or may only be exposed to one side of the wall, neither of which creates a pore. Additionally, it may take multiple bubbles being linked together to actually form a passage completely through the hose, which increases the resistance of the path. Both of these conditions can lead to inefficiencies, which can reduce the efficacy of an air lift which employs such a diffuser.

Generally, the size of the air bubbles which are diffused into water during aeration thereof can be varied by providing a diffusion device with smaller or larger pores formed therein, smaller pores producing smaller bubbles. Some known devices favor the use of smaller bubbles, because smaller bubbles are absorbed more readily into water. However, for reasons described above, many known devices for diffusing fine air bubbles into water are expensive or inefficient to operate. Other known devices favor the use of larger, more coarse bubbles because such bubbles travel through water at a higher velocity.

Therefore, there exists a need for a device which is useful for aerating a large volume of liquid that does so efficiently while utilizing a less-expensive or more reliable diffusion device that provides for adequate absorption of gas into the liquid medium.

SUMMARY OF THE INVENTION

In accordance with the present invention, a process has been devised for the aeration of a body of liquid medium, such as water, having a bottom surface comprising providing a housing adapted for flotation within the liquid medium, mounting a hose to a predetermined location in the housing substantially parallel to the surface of the liquid medium at a predetermined first distance from the surface of the liquid medium and at a predetermined second distance from the bottom surface, the hose having a plurality of pores formed therein, supplying a gas to the hose at a predetermined gas supply rate in order to aerate the liquid medium at a standard aeration efficiency of greater than about 4 pounds of oxygen per hour per horsepower in fresh water. Preferably the predetermined gas supply rate is between about 1/10 and 10 SCFM per linear foot of hose, and most preferably between about 0.2 and 1.0 SCFM per linear foot of hose.

In accordance with one embodiment of the process of the present invention, the hose comprises a plurality of hose sections disposed in a parallel array. Preferably, the plurality of hose sections are regularly spaced apart a distance of between about 1 and 5 inches between the centers of the parallel array of hose sections, preferably at a distance of about 2 inches between the centers of the parallel array of hose sections.

In accordance with a preferred embodiment of the process of the present invention, the predetermined first distance is between about 6 inches and 48 inches, preferably between about 29 inches and 48 inches, and most preferably at least about 36 inches.

In accordance with another embodiment of the process of the present invention, the predetermined second distance is at least about 4 inches, preferably at least about 18 inches, and most preferably at least about 24 inches.

In a preferred embodiment, the standard aeration efficiency is greater than about 6 pounds of oxygen per hour per horsepower in salt water.

In yet another embodiment of the process of the present invention, the process provides aeration of the liquid medium at a standard oxygen transfer rate of greater than about 4 pounds of oxygen per hour in fresh water.

In another embodiment of the process of the present invention aerates the liquid medium at a standard oxygen transfer rate of greater than about 6 pounds of oxygen per hour in salt water.

The present invention relates to a device for use in a liquid medium. The device includes a housing adapted to float within the medium such that a top portion thereof remains above a top surface of the medium. The housing has a bottom portion and an open side portion. The device further includes a hose affixed to the bottom portion of the housing substantially parallel to the surface of the liquid medium. The hose has a wall with a plurality of pores formed therein. The plurality of pores has an average diameter of between about 0.001 inches and about 0.004 inches and is spaced apart substantially evenly throughout the length of the hose. The device further includes a gas-supplying pipe affixed to the hose and means for supplying a gas to the pipe such that the gas passes through the pipe and into the hose.

The means for supplying gas to the pipe may include a blower located outside of the liquid medium. The blower can be connected to the pipe by a flexible hose having a first end and a second end, the first end being affixed to an outlet portion of the blower and the second end being affixed to an inlet portion of the pipe.

A further embodiment of the present invention is directed toward a device for use in a liquid medium. The device includes a housing adapted to float within the medium such that a top portion thereof remains above a top surface of the medium. The housing has a bottom portion and an open side portion. The device further includes a pipe affixed near the open bottom portion of the housing. The pipe forms a rectangle having a first side and a second side. A plurality of hose portions, each having a first end and a second end, the first ends of the plurality of hose portions being affixed to the first side of the rectangle of pipe, and the second ends of the plurality of hose portions are affixed to the second side of the rectangular pipe, such that the gas can flow into the plurality of hose portions from the pipe at the first end and the second end of the plurality of hose portions. Each of the plurality of hose portions further has a wall with a plurality of pores formed therein, the plurality of pores having an average diameter of between about 0.001 inches and about 0.004 inches, and being spaced apart substantially evenly throughout a length of the hose. Each of the plurality of hoses is formed from thermoset polymer particles distributed within a matrix of a thermoplastic binder material. The device further includes means for supplying a gas to the pipe such that the gas passes through the pipe and into the plurality of hoses.

A further embodiment of the present invention is directed towards a device for use in a liquid medium comprising a housing adapted for flotation within the liquid medium, the housing having an open bottom portion, an open side portion, and a plurality of side wall portions having a top end and a bottom end, each of the plurality of side wall portions comprising a pair of side wall sections and an intervening space for creating buoyancy in the device to provide for the flotation; a hose affixed to the bottom portion of the housing substantially parallel to the surface of the medium and having a wall with a plurality of pores formed therein spaced apart substantially evenly throughout the length of the hose; a gas supply pipe affixed to the base, and means for supplying a gas to the gas supply pipe. Preferably, the bottom portion of the housing is spaced a predetermined distance from the bottom end of the plurality of side wall portions, providing an open area therebetween. Preferably, the predetermined distance is from about 6 to 24 inches, more preferably about 6 inches.

In accordance with one embodiment of this device, the distance from the top end to the bottom end of the plurality of side walls is from about 18 inches to 4 feet, preferably about 18 inches. In a preferred embodiment, the plurality of pores has an average diameter of between about 0.001 inches and about 0.004 inches.

In a preferred embodiment, the device includes a hose support member disposed within the hose and extending at least the entire length thereof, the hose support member being somewhat rigid so as to prevent sagging of the hose.

In accordance with another embodiment of the device of the present invention, the hose comprises a plurality of hose portions, and preferably the plurality of hose portions is distributed substantially evenly along the bottom portion of the housing. In a preferred embodiment, the distance from a center of one of the plurality of hose portions to an adjacent one of the plurality of hose portions is from about 1 to 5 inches, preferably about 2 inches.

In accordance with another embodiment of the device of the present invention, the device for use in a liquid medium comprises a housing adapted for flotation within the liquid medium such that a top portion thereof remains above a top surface of the medium, the housing having an open bottom portion, an open side portion, and a plurality of side wall portions having a top end and a bottom end; a hose affixed to the bottom portion of the housing substantially parallel to the surface of the medium and having a wall with a plurality of pores formed therein spaced apart substantially evenly throughout a length of the hose, at least one of the plurality of side wall portions including an open area for permitting the liquid medium to flow therethrough, a gas supply pipe affixed to the base; and means for supplying a gas to the pipe. In a preferred embodiment, the bottom portion of the housing is spaced a predetermined distance from the bottom ends of the at least one of plurality of side wall portions, providing the open area therein. In a preferred embodiment, the predetermined distance is from about 6 to 24 inches, preferably about 6 inches. In accordance with one embodiment of this device, the distance from the top end to the bottom end of the plurality of side walls is from about 18 inches to 4 feet, preferably about 18 inches. In a preferred embodiment, the plurality of pores has an average diameter of between about 0.001 inches and about 0.004 inches.

BRIEF DESCRIPTION OF THE DRAWINGS

The present invention will be better understood on reading the following detailed description of nonlimiting embodiments thereof, and on examining the accompanying drawings, in which.

DETAILED DESCRIPTION

Figure 1:
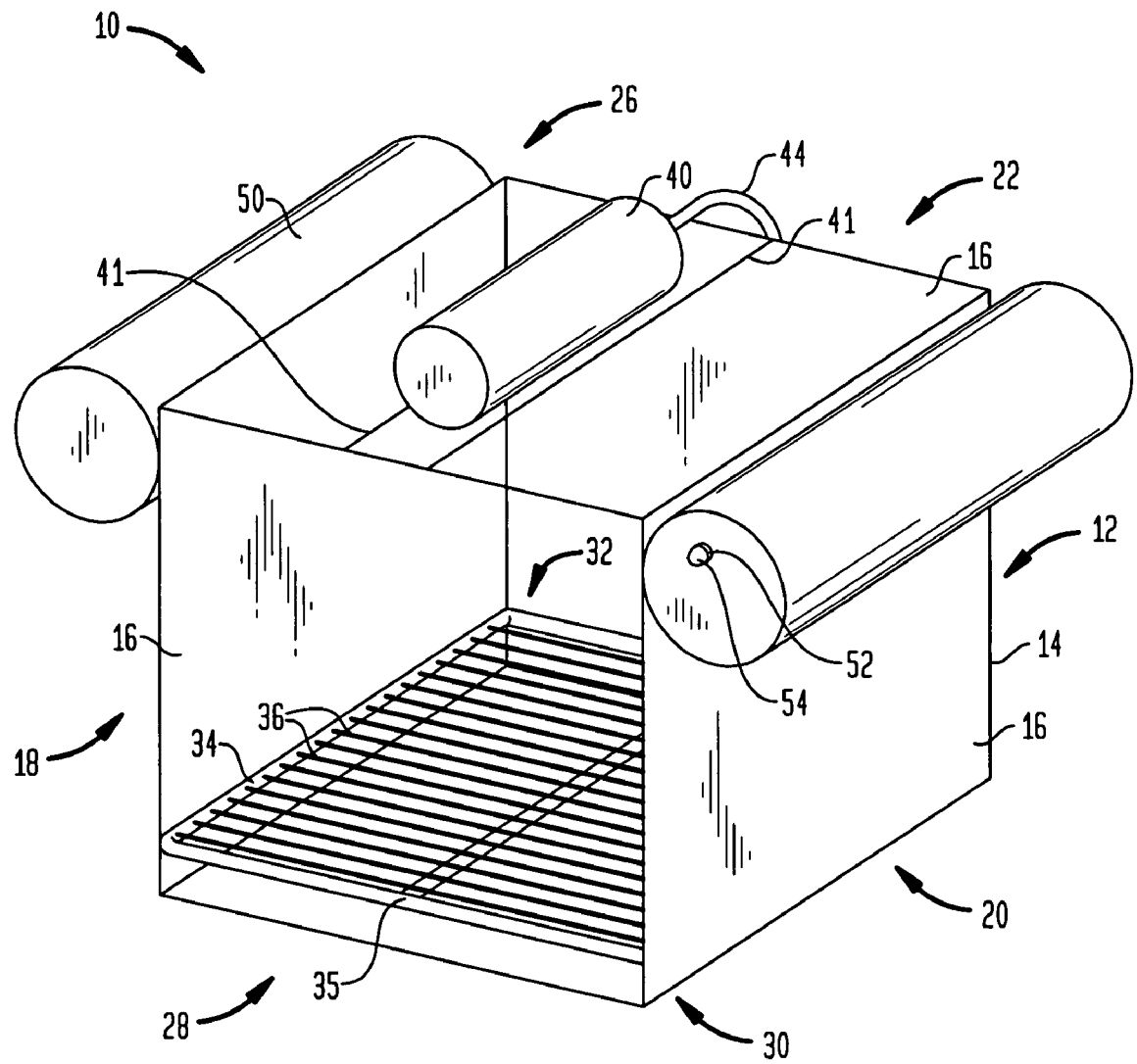
FIG. 1 is a front perspective view of an aeration device according to an embodiment of the present invention.

Referring now to the figures, wherein like reference numerals refer to like features, there is shown in FIG. 1 a device 10 according to an embodiment of the present invention. The device has a housing 12 including a frame 14. Frame 14 may be made of any material that is strong enough to support the weight of the remaining components of the device 10 and will not corrode or otherwise degrade in the presence of water, including salt water or water with waste materials or other chemicals dissolved therein. Preferably, support members are made from marine-grade aluminum or another similar metal. Support members are preferably assembled by welding or other known methods, including the use of screws, bolts, rivets or the like.

Frame 14 is structured to provide the desired shape for housing 12. The structure of frame 14 shown herein is in the shape of a rectangular prism, although other acceptable shapes for aeration devices, such as cylinders, are possible. The use of these designs, as well as other variations of the design shown in the figures, would be understood by those having skill in the art. In the design of housing 12 shown in FIGS. 1 and 2, side walls 16 are affixed to frame 14 on the right 18, left 20 and back 22 sides thereof. As used herein, the terms top, bottom, left, right, front and back are used only for convenience in referring to the geometric frame of reference used in the figures, and are not intended to limit the scope of the invention. Side walls 16 on right, left and back sides 18, 20 and 22 are preferably made from a material having similar properties to those of frame 14, and are further preferably made from marine-grade aluminum. Side walls 16 can be affixed to frame 14 by conventional means, including screws, bolts, rivets, adhesive or welding. If any fastening devices, such as screws, are used for connecting various parts of device 10 together, such fastening devices should be made from commercial grade stainless steel.

Figure 7:
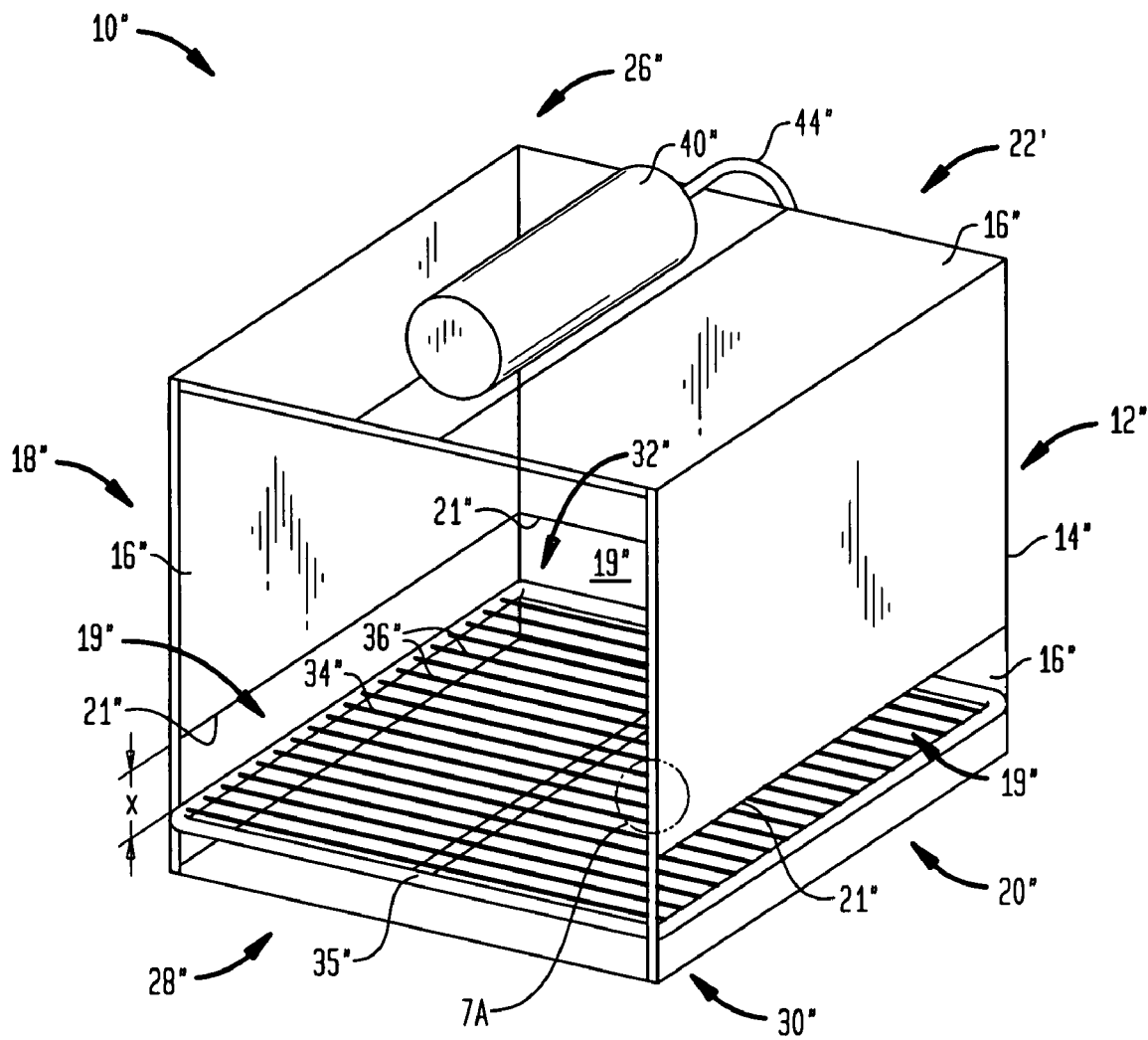
FIG. 7 is a front, perspective view of another embodiment of an aeration device of the present invention.

Front 28, top 26, and bottom 30 of housing 12 are left substantially open. This allows the device, during operation, to draw in water from bottom 30 of housing 12 and to expel water through at least a portion of front 28 thereof. Such operation is described in further detail below. However, it is possible to include a solid top 26, and one embodiment of the present invention which utilizes a solid top is shown in FIG. 7 and discussed below.

Referring to FIG. 1, grid 32 is secured within housing 12 of device 10 near the bottom 30 thereof. Grid 32 includes a pipe 34 and at least one air-permeable hose 36 in fluid communication therewith. Preferably, hose 36 projects in a substantially perpendicular direction from pipe 34. Further preferably, hose 36 extends in a direction substantially parallel to the surface of the liquid medium in which the device 10 is used, although other arrangements are possible. Pipe 34 is preferably made from a material that does not corrode or otherwise degrade in the presence of water, including water with salt or other chemicals dissolved therein. One example of a suitable material for pipe 34 is PVC, preferably marine-grade PVC. It is thus preferred that pipe 34 be relatively rigid, particularly as compared to the more flexible hose 36. This provides a relatively rigid gas (air) supply line, which will not readily bend or kink.

Hose segments 36 have a gas-permeable wall including a plurality of micropores extending through the wall 38 thereof and having an average diameter in the range of about 0.001 inches to about 0.004 inches. Such a hose 36 is preferably of the type disclosed in U.S. Pat. No. 5,811,164, issued Sep. 22, 1998, to Mitchell ("the '164 Patent"), the disclosure of which is incorporated herein by reference thereto in its entirety. This type of hose 36 is made from thermoset polymer particles in a matrix of a thermoplastic binder material, which may be made according to a method described in the '164 Patent. Preferably, the thermoset polymer particles have a mesh size of about 60 to 140 mesh and, more preferably, of about 80 to 100 mesh. Further, it is preferred that the micropores in wall 38 of hose 36 have a uniformity of at least about 80% and more preferably of at least about 90%. Additional variations of a similar hose are further described in a co-pending U.S. Provisional Patent Application entitled "Aeration Device For Use As A Diffuser," filed on May 8, 2006, and having an attorney docket number TEKNI 3.8-008, the disclosure of which is incorporated herein by reference thereto in its entirety.

Figure 5A:
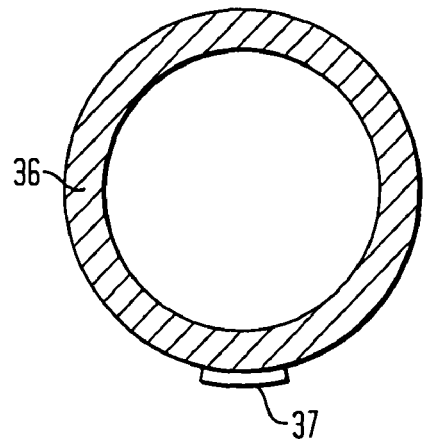
FIGS. 5a and 5b are cross-section views of a hose portion having an air-impermeable stripe formed thereon.

Additionally, a hose of the type described in the '164 patent can be further adapted to include a portion thereof which is air impermeable. Such a portion may be generally in the form of a longitudinal stripe that extends along the length of the hose section. This stripe may be formed from nonporous polymer such as polyethylene, which may be applied to hose 36 during formation thereof using a co-extrusion process. Additional materials which can be used to form stripe 37 are polyvinylchloride, ABS and polypropylene. Alternatively, the stripes may be applied by re-melting the porous polymer of the hose itself by the application of a hot iron or the like having the appropriate shape and size to re-melt the polymer at the location where the nonporous stripe is desired. Further, a latex or similar material may be applied after formation of hose 36 by painting. The air impermeable stripe is preferably of a width between 0.10 and 1 inch, preferably from about 0.125 to 0.25 inches, and is more preferably about 0.25 inches in width. In terms of the lateral circumference of the hose, the impermeable stripe can vary from about 1% to 50% of the entire circumference, but preferably is from about 4% to 8% thereof. When a hose of this type, having an air impermeable stripe formed thereon is used in a device of the present invention, the stripe may be oriented in a downward direction with respect to the remaining hose (as shown in FIG. 5a). This may be advantageous because, when a device having a hose that is air permeable around the entire circumference thereof is used in such a device, the bubbles which emanate from the lower portion of the hose tend to coalesce with bubbles emanating from the upper portions of the hose as these bubbles pass along the hose body. Such coalescence results in the production of coarse bubbles, which is disadvantageous. Accordingly, the inclusion of stripe 37 on hose portion 36 may result in the production of a greater proportion of fine bubbles.

Figure 5B:
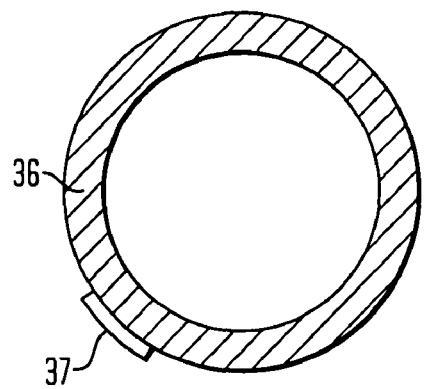

Additionally, the air impermeable stripe 37 can be positioned in an offset fashion, as illustrated in FIG. 5b. In such an arrangement, stripe 37 is preferably positioned at a point offset from the bottom of the hose by between 5 and 45 degrees in either direction. By doing so, the hose can provide for additional directional flow of the liquid medium. For example, as illustrated in FIG. 5b, stripe 37 is directed toward the back 22 of the device. This results in a greater proportion of air bubbles being produced on the front portion of the hose, as compared to the back portion thereof, which tends to direct the liquid toward the front of the device and tends to draw more of the liquid from the rear of the device.

It has been found that a hose of the type described in the '164 Patent is able to diffuse air into water in an amount comparable to that of a diffuser which produces much larger air bubbles without requiring a greater power input for the blower. In other words, there is a relatively low amount of head loss in the hose of the '164 Patent. Additionally, the diffusion hose of the '164 Patent has a lower head loss than other known fine bubble diffusers. Furthermore, it has been found that fine air bubbles are more readily absorbed into water per volume of air compared to large, or coarse, air bubbles. This increased absorption is due to the increased surface area of the smaller bubbles per unit of volume of air in water. Increased surface area increases absorption of air into water because air is absorbed into water only at the surface of a bubble. The relatively low head-loss of the diffusion hose of the '164 Patent combined with the high level of absorption of air (or other gasses) into water (or other liquids) leads to a high efficiency for the hose, making it particularly suitable for use as a hose 36 in the device 10 of the present invention. However, other types of diffusion devices may be used.

Preferably, grid 32 includes a plurality of hose portions 36 affixed to pipe 34 which is preferably in the form of a rectangular frame. In such an arrangement, hose portions 36 are coupled to pipe 34 at both ends such that gas flowing through pipe 34 can enter hose 36 from either side. In the particular arrangement show in FIG. 1, pipe 34 is configured as a rectangle secured near the bottom 30 of housing 12 such that it forms a plane that is parallel to the plane formed by bottom 30 of housing 12. Preferably, grid 32 is about eight feet wide (measured from the right side 18 to the left side 20) and about four feet deep (measured from the front 28 to back 22). However, the size of grid 32 can be varied in accordance with the volume of liquid to be aerated. Further, it may be necessary to alter the preferred dimensions in order to fit grid 32 within housing 12. In this arrangement, hose portions 36 extend transversely across pipe 34 from near the left side 18 of the housing 12 to near the right side 20 of the housing 12. Additional arrangements, including one in which hose portions 36 extend transversely from front 28 to back 22 of housing 12, are possible and would be understood by those with skill in this art. Grid 32 may also include support 35 for hose portions 36 in order to prevent excess movement or sagging of hose portions 36 during use of device 10. Preferably, support 35 extends over both the top and bottom of each hose portion 36. Additionally, it is preferred that at least one support 35 is used for each 24 inches of length for hose portions 36.

Figure 6:
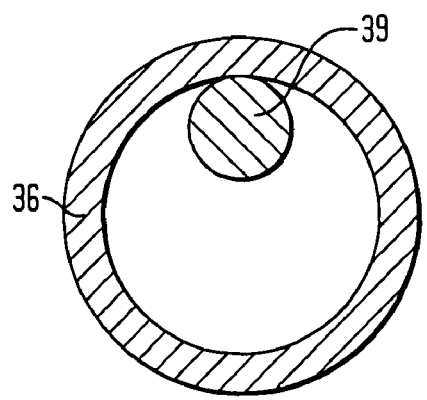
FIG. 6 is a cross section view of a hose portion having an internal support included therein.

Hose portions 36 are preferably affixed to pipe 34 using standard ½-inch NPT barbed inserts. Further, hose portions are preferably spaced along the length of pipe 34 at regular intervals ranging from about 1 to 5 inches, and preferably of about 2 inches from center to center. Additionally, as shown in FIG. 6, an internal support 39 can be placed inside of each hose portion 36. Internal support 39 can be made from any material having a sufficient rigidity to provide support for the hose portion 36 along the length thereof. Internal support 39 preferably has a length such that it extends into the fittings or other such structures by which hose portions 36 are affixed to grid 32. Accordingly, internal supports 39 are preferably sized so as to fit within the selected attachment between hose portions 36 and grid 32. Suitable materials for internal support 39 include polyvinylchloride, ABS, stainless steel, aluminum or any other material with sufficient strength and/or rigidity to support hose portions 36. Furthermore, although internal support 39 is shown in FIG. 6 as being round, additional shapes are possible, including triangular, square or that of an I-beam.

Figure 3:
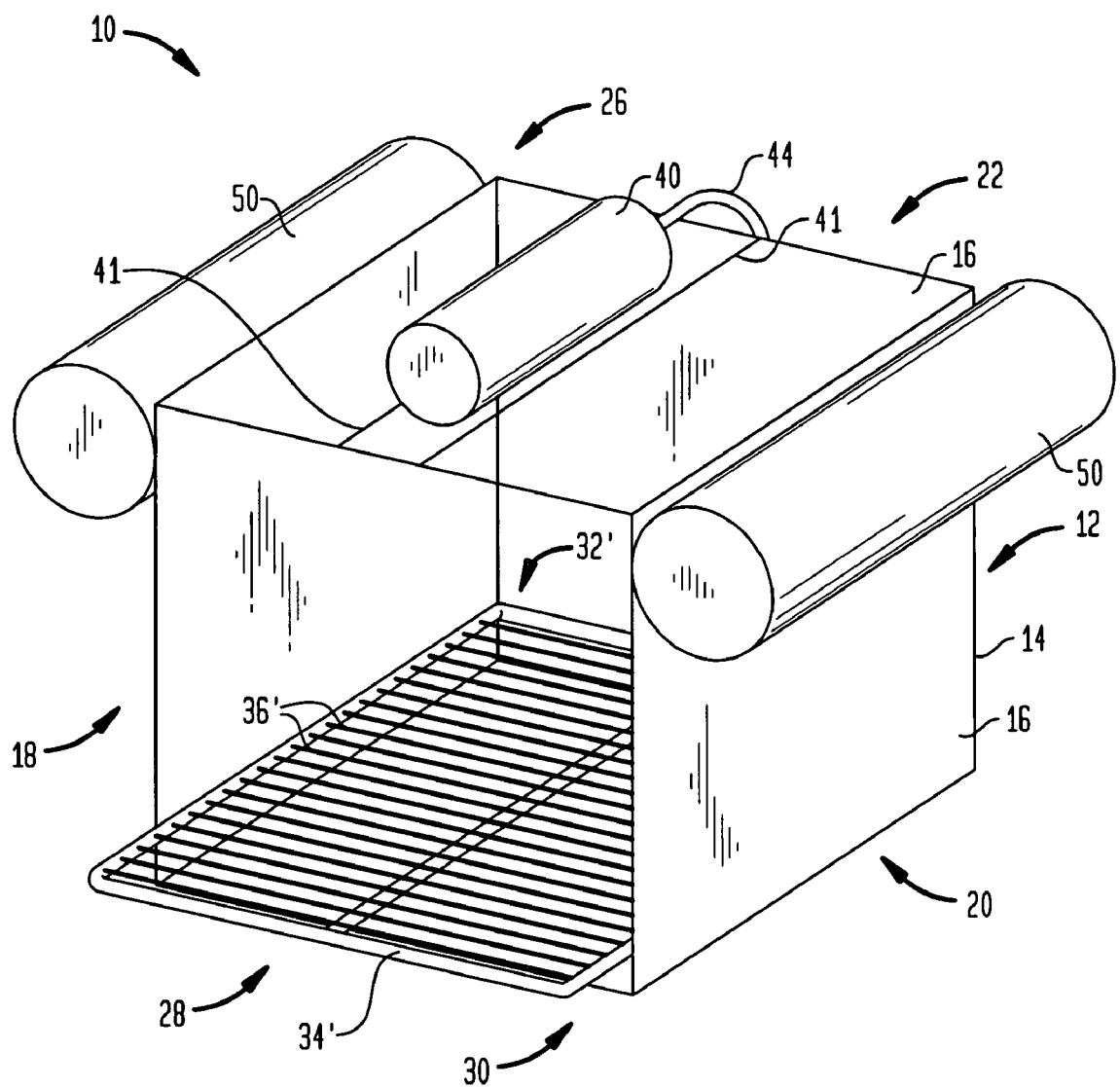
FIG. 3. is a front perspective view of an aeration device according to an alternative embodiment of the present invention.

As shown in FIG. 3, in an alternative embodiment of the device 10 of the present invention, pipe 34' can be formed in the shape of a rectangle that extends beyond the front 28 of the housing 12. In such an arrangement, a portion of the frame 14 to which grid 32' is secured can also extend beyond the remainder of the front 28 of housing 12 in order to provide support for grid 32'.

Figure 2:
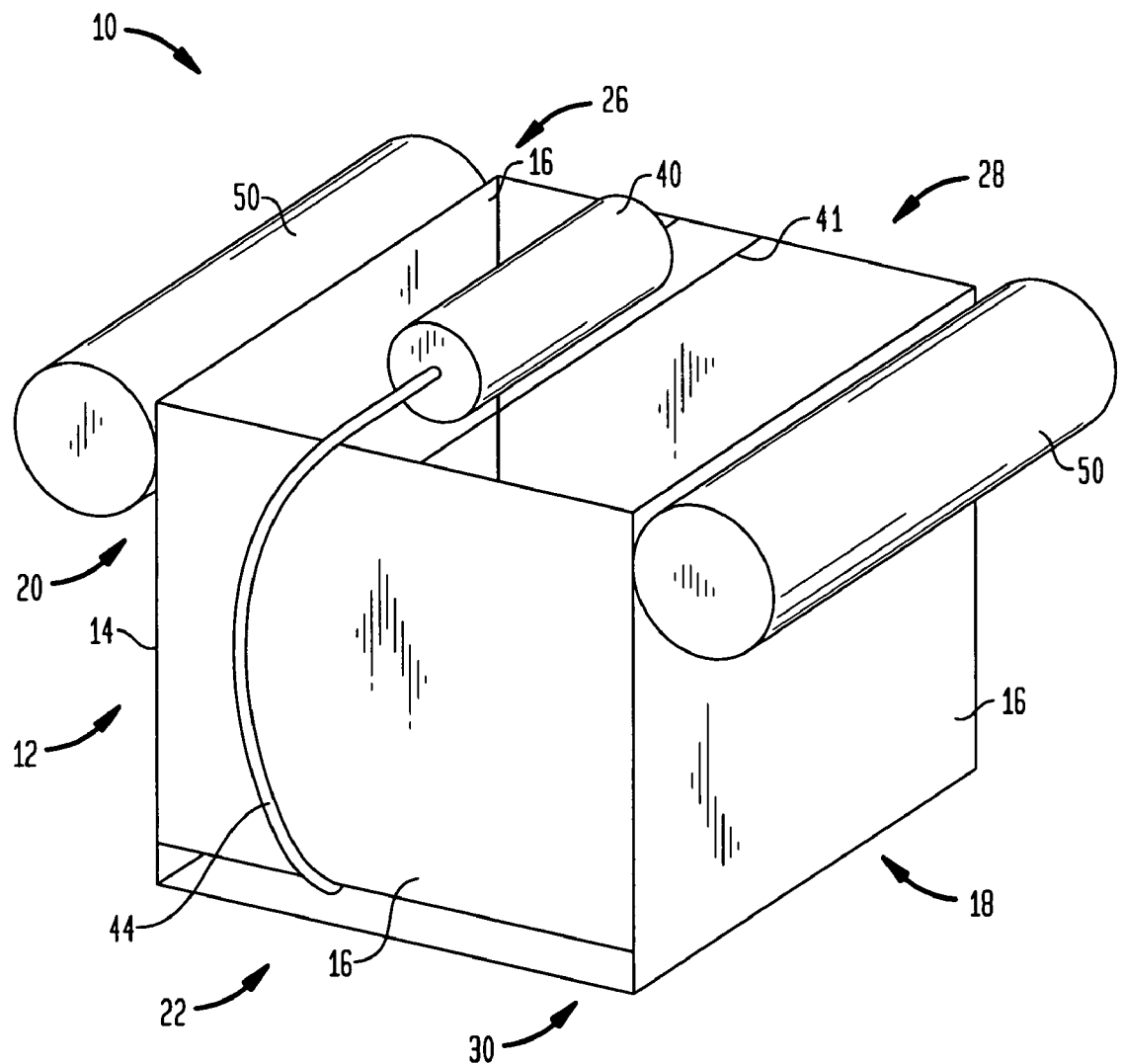
FIG. 2 is a rear perspective view of an aeration device according to an embodiment of the present invention.

Returning now to the embodiments shown in FIGS. 1 and 2, pipe 34 is connected to a gas source 40, which is preferably in the form of a pump or blower. More preferably, gas source 40 is a regenerative blower. Further, it is preferred that gas source 40 be of a type which does not require the use of oil, as this could cause oil to travel into hose portions 36, which can cause damage thereto. A pump or blower is used in this arrangement to supply pressurized ambient air to grid 32, which is then diffused into the liquid medium through hoses 36. Preferably, the gas source 40 supplies gas to the hose portions 36 at a rate of between 1/10 and 10 standard cubic feet per minute (SCFM), per linear feet of hose used in grid 32. More preferably, the gas source 40 supplies gas to hose portions 36 at a rate of between about 0.2 and 1.0 SCFM per linear foot of hose, and more preferably at a rate of about 0.4 to 0.5, and preferably 0.4 SCFM per linear foot of hose. As shown in FIGS. 1 and 2, gas source 40 is affixed to top 26 of housing 12, such as by means of support struts 41, and is connected to pipe 34 using a flexible tube 44 at an inlet portion 42 thereof. Flexible tube 44 is preferably what is known as a high-pressure fertilized solution hose, although other types of flexible tubes may be suitable. In order to provide for dissipation of any excess heat added to the air by the operation of gas source 40, a section of metal tubing 45 (FIG. 4) may be affixed between the outlet portion of the gas source and the flexible tube 44. Preferably, the section of metal tubing 45 has a diameter of about 2 inches and a length of between 1 foot and 4 feet. More preferably, the section of metal tubing 45 has a length of about 18 inches. The section of metal tubing may be made from galvanized steel or any other similar metal. If a pump or blower is used as gas source 40, it is necessary that the pump or blower be located outside of the liquid medium, but it is not necessary that the pump or blower be affixed to top 26 of housing 12. Rather, the pump or blower can be located anywhere outside of the water, where it can be connected to inlet portion 42 of grid 32 using flexible tube 44. Furthermore, to reduce the likelihood that debris from within the ambient air becomes entrapped in the pores of hose portions 36, an air filter (not shown) may be used in conjunction with gas source 40.

Floats 50 are affixed to housing 14, preferably on at least two sides (for example, left 18 and right 20 sides as shown in FIG. 1) near the top 26 thereof. Floats 50 are designed and positioned on housing 12 in order to maintain device 10 at an appropriate level within the liquid medium. Generally, an appropriate level for device 10 is such that grid 32 is between about 20 and 55 inches below the surface of the liquid medium in which device 10 is used. The positioning of grid 32 relative to the surface of the liquid medium will depend not only on the positioning of floats 50, but will also depend on the dimensions of housing 12. For example, in the device 10 shown in FIG. 1, the vertical centerline of grid 32 is spaced below the top 26 at a distance of approximately 48 inches, and the center of buoyancy for floats 50 in water is approximately 1 inch below top 26 of housing 12; however, these dimensions can vary. The dimensions of device 10, including the depth of frame 14 and the positioning of floats 50 relative to frame 14 should be such that grid 32 is between about 6 and 48 inches below the surface of the liquid medium, preferably between about 29 and 48 inches below the surface of the liquid medium, and most preferably at least about 36 inches below the surface of the liquid medium. Furthermore, housing 12 of device 10 should not rest on the bottom surface of the pond or other location where it is used.

Floats 50 shown in FIG. 1 are in the form of hollow cylinders which are impermeable to air and water; however, various other types of floats are possible, including those made of foam or the like. Floats may also include ports 52 formed therein which are sealed with removable plugs 54. Ports 52 allow for the introduction of water or other fluids into floats 50 in order to adjust the center of buoyancy of floats 50, which allows the overall position of device 10 within the liquid medium to be manipulated. For example, by adding water, the center of buoyancy of the floats 50 is raised, thereby lowering device 10 with respect to the surface of the liquid medium. It has also been learned that for maximum performance, it is best to locate the device 10 so that the grid 32 of hoses 36 is located a minimum distance of about 4 inches from the bottom surface over which the device 10 is operating, such as the bottom of a lake, pond, or tank in which it is operating, preferably a minimum distance of about 19 inches from the bottom surface, and most preferably a minimum distance of about 24 inches from the bottom surface. The size and positioning of floats 50 will vary depending on the composition of the liquid medium and the size and weight of device 10. Additionally, a float 50 may be affixed to the back 22 of the housing to provide additional buoyancy, if necessary.

Figure 7A:
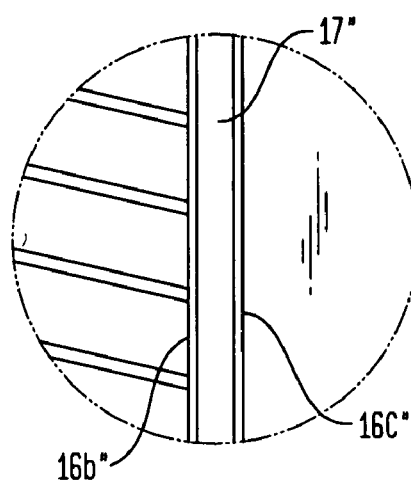
FIG. 7a is a side, partial, elevational, enlarged view of a portion of FIG. 7.

Turning to FIG. 7, another preferred embodiment of the device 10" of the present invention is shown therein. In this case, like reference numerals indicated with a double prime designation correspond to the same reference numerals employed in FIG. 1. In this case, the device 10" has a housing 12" including a frame 14". Once again in this case, the structure of frame 14" is in the shape of a rectangular prism, although once again, other acceptable shapes for aeration devices such as cylinders are also possible. In the design of housing 12" shown in FIG. 7, side walls 16" are affixed to frame 14" on the right 18", the left 20" and the back 22" sides thereof. In this case, however, the device 10" shown therein does not include the floats 50 used in the embodiment shown in FIG. 1 hereof. Instead, each of the side walls 16", and possibly also the top wall 16", includes a sealed double-walled construction, which can be seen in FIG. 7a, including a pair of side walls 16a" and 16b". Thus, between these pair of side and top walls is located a space 17" which can contain a gas such as air to provide for flotation of the device, instead of the floats 50. Once again, these side walls 16a" and 16b" are preferably made from material having similar properties to those discussed above with respect to frame 14, such as preferably being made from marine-grade aluminum. Each of the side walls 16a" and 16b" can thus be affixed to frame 14" by conventional means, including screws, bolts, rivets, adhesive or welding. If any fastening devices, such as screws, are used for connecting various parts of device 10" together, such fastening devices should be made from commercial grade stainless steel.

As in the case with the embodiment shown in FIG. 1, the front 28" and the bottom 30" of the housing 12" are left substantially open. In this case, however, it is possible for the top 26" to include the double-walled construction similar to that of the side walls 16" discussed above. In a preferred embodiment, however, at least one of and preferably all of the side walls 16" on the right, left and back sides, 18", 20" and 22", includes at least one open area 19" that then permits some flow of water through one or preferably all three of these side walls 16". In the specific embodiment shown in FIG. 7, at least one, but preferably all of the side walls 16" do not extend the entire length or depth of the side wall, but an open area 19" is left between the bottom end 21" of each of the side walls 16" and the grid 32" of hoses 36". This open area between the grid 32" and the bottom of the side wall 16", as represented by the distance X shown in FIG. 7, or any other such open area created at any other location in the side wall 16" is preferably from about 6 inches to 24 inches, with a distance of about 6 inches being preferred. The presence of this open area(s) permits more water to pass over the grid for aeration purposes and further increases the directional flow of the water, as is discussed more fully below.

Figure 4:
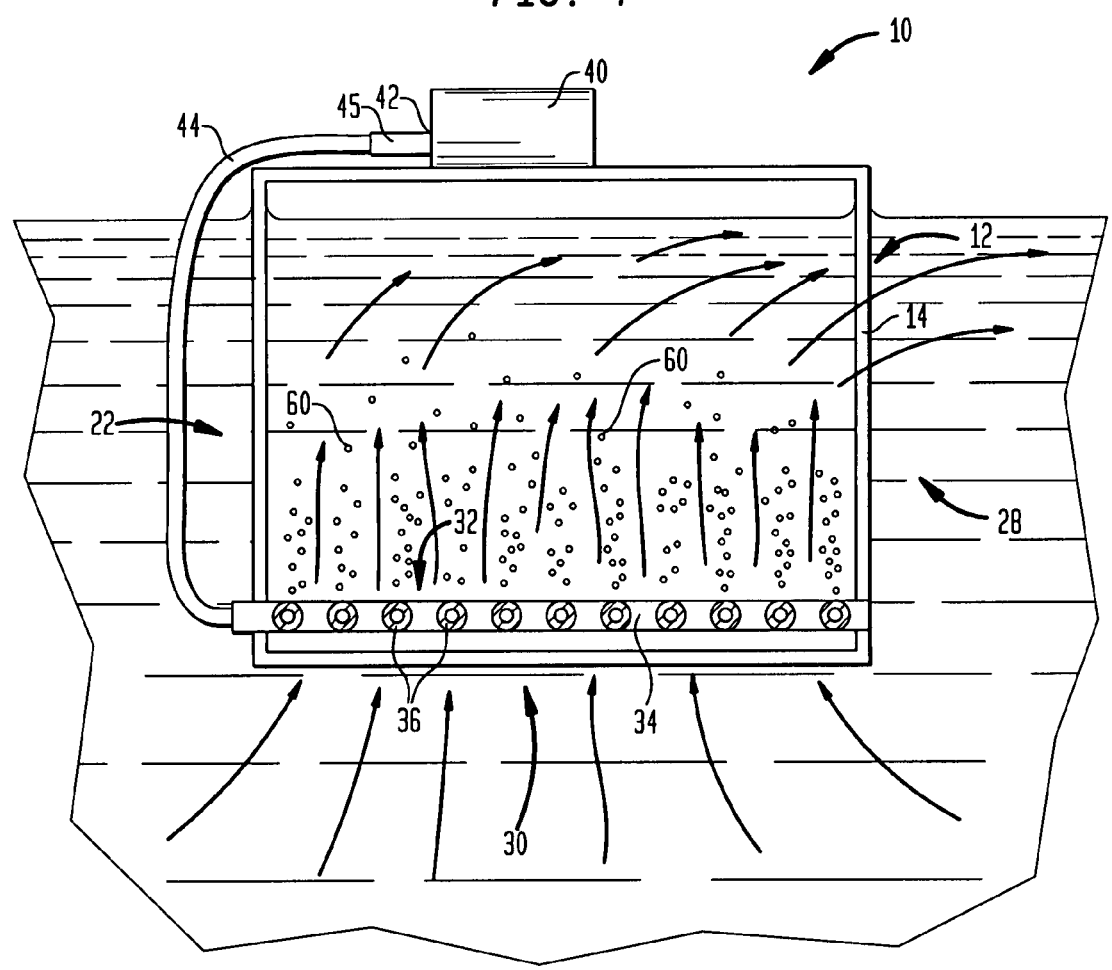
FIG. 4 is a cross-section view of an aeration device according to an embodiment of the present invention.

In operation of device 10, as illustrated in FIG. 4, a gas source, which is preferably in the form of a regenerative blower, forces gas, which is preferably ambient air, through tube 44 and into pipe 34. The gas then flows into hoses 36 and the pressure of the system increases until it reaches a level sufficient to force the gas through the micropores within the walls 38 of the hoses 36. This causes the formation of a large number of small gaseous bubbles 60 within the liquid medium adjacent to the hoses 36. Because the gas is less dense than the liquid medium (as is the case when air is diffused into water), the bubbles rise away from the hose. As additional air is continued to be forced into the system, additional bubbles are formed in the liquid medium and rise away from the hoses 36. The surface tension of the liquid medium causes some of the liquid medium to rise with the bubbles, thereby causing circulation of the liquid medium, as illustrated in FIG. 4. Additionally, as some of the gas within the bubbles is absorbed into the liquid, this aerated liquid rises toward the top of the liquid. As additional liquid rises upward, the pressure of the water near the top of the device increases, forcing at least some of the water out of the open front 28 of the housing 12.

The movement of liquid vertically away from hose portions 36 and out of front 28 of device 10 creates a vacuum effect in the liquid below hose portions 36, which serves to draw liquid upward and toward hose portions 36 from below device 10. The device of the present invention circulates enough liquid (particularly water) therethrough to draw liquid from at least 10 feet below the surface, depending on the properties of the liquid. This is more than sufficient for most applications, particularly aquaculture and waste-water treatment, as water depths in these applications is typically between 5 and 7 feet.

As the operation of the device is continued, the aerated liquid is continued to be forced away from the device by the liquid that rises away from the hose portions 36 and out of front 28 of housing 12. As the vacuum force created by this circulation continues to draw water away from the bottom of the medium, at least some of the aerated water is drawn downward from the upper surface of the liquid medium. After a sufficient period of operation, which depends on the volume of the medium and the output of the device 10, the entire liquid medium can be aerated by device 10. For example, a device 10 according to an embodiment of the invention, wherein grid 32 includes a 48 inch by 48 inch rectangle of pipe 43 with hose portions 36, each having a diameter of approximately 1.000 inches, spaced along the length of the rectangle of pipe 34 at 2 inch intervals (from center-to-center of adjacent hoses 36), is sufficient to aerate a pond containing water and having an average depth of 6 feet and an average overall area of 1 to 3 acres.

Larger volumes of water (or other liquid medium) can be aerated using either multiple devices as described above or by using a larger device. Typically, such a larger device will have a grid that is about 48 inches from front 28 to back 22, as described above, but has a greater width, which can be up to 16 feet. The housing 12 of such a device will vary in accordance with variations in the size of grid 32.

The operation of device 10″ illustrated in FIG. 7 is very similar to that discussed above in connection with the device shown in FIG. 4. In the case of the device 10″ in FIG. 7, however, the presence of open areas 19″ either within or below side walls 16″ increases the circulation of water into the lower portion of the device 10″, and thus more water passes over the grid 32″ for aeration purposes. This, in turn, results in an increase of directional flow of the water as shown in FIG. 4, which further increases the ability of the device to aerate an entire pond or other pool of water therewith. Furthermore, the use of a solid top wall 26″ can itself result in a greater directional flow of aerated water out of the front 28″ of the device 10″.

By utilizing the devices of the present invention in the manner discussed above, it is possible to obtain aeration at an efficiency and aeration or oxygenation potential which is far superior to that which has been achievable in the past. In particular, it is now possible, by controlling the specific parameters discussed above, to obtain these increased efficiencies and aeration potentials at a level not seen before in both fresh water and salt water alike. As a measurement of these parameters, the standard aeration efficiency ("$SAE_{wire}$") can now be obtained in fresh water at levels of greater than 4 pounds of oxygen per hour per horsepower (e.g., of the blower) and preferably between about 4 and 8 pounds of oxygen per hour per horsepower, and in salt water at a level of greater than about 6 pounds of oxygen per hour per horsepower, and preferably between about 6 and 15 pounds of oxygen per hour per horsepower. These devices have for example been compared to standard devices such as the surface aeration devices discussed above, and are at least double the efficiency thereof. Similarly, the aeration or oxygenation potential of these devices as measured in standard oxygen transfer rates ("SOTR") in fresh water can achieve an SOTR of greater than 4 pounds of oxygen per hour, preferably between about 4 and 10 pounds of oxygen per hour, and in salt water greater than about 6 pounds of oxygen per hour and preferably between about 6 and 18 pounds of oxygen per hour.

In order to achieve these efficiencies and oxygenation potentials, again the specific parameters discussed above, when used in conjunction with the apparatus described above, can lead to these results. Thus, by utilizing a blower which delivers the gas to the hose portions at a rate of between 1/10 and 10 SCFM per linear foot of hose, preferably between about 0.2 and 1.0 SCFM per linear foot of hose, and more preferably at between about 0.4 and 0.5 SCFM per linear foot of hose and most preferably about 0.4 SCFM per linear foot of hose; by placing the device of the present invention so that the hose is disposed between about 6 and 48 inches below the surface of the liquid medium, preferably between about 29 and 48 inches below the surface of the liquid medium, and most preferably at least about 36 inches below the surface of the liquid medium; by disposing the hose in the device of the present invention a minimum distance of about 4 inches from the bottom surface over which the device is operating, preferably a minimum distance of about 18 inches from the bottom surface and most preferably a distance of about 24 inches from the bottom surface, by increasing the flow of water through a device by including open areas in the side walls thereof, and by utilizing an array of hoses which are parallel and spaced apart a distance of between about 1 and 5 inches from center to center of each hose, preferably about 2 inches from center to center, it is possible to achieve these highly improved results.

The above figures for SAE and SOTR data were calculated using a nonlinear regression technique approved as an ASCE standard therefor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A device for the aeration and circulation of a liquid medium having a surface comprising:
a housing adapted for flotation within the liquid medium, said housing having a substantially open bottom having a predetermined area, a top portion, and an open side portion having an area substantially corresponding to said predetermined area of said open bottom, said open side portion extending substantially continuously from said substantially open bottom to said top portion adjacent to said surface of said liquid medium, and a plurality of side wall portions having a top end and a bottom end thereby defining a substantially open interior portion defined by said plurality of side wall portions of said housing, each of said plurality of side wall portions comprising a pair of parallel side wall sections and an intervening space between said pair of side wall sections for creating buoyancy in said device to provide for said flotation;
a plurality of hose portions affixed to said substantially open bottom of said housing substantially parallel to the surface of the liquid medium thus providing an array of hose portions, said array of hose portions having a wall with a plurality of pores formed therein, spaced apart substantially evenly throughout a length of said hose;
a gas supply pipe affixed to said substantially open bottom of said housing; and
means for supplying a gas to said gas supply pipe.

2. The device of claim 1 wherein said bottom end of each of said plurality of side wall portions is spaced a predetermined distance from said plurality of hose portions, providing an open area therebetween.

3. The device of claim 2 wherein said predetermined distance is from about 6 to 24 inches.

4. The device of claim 2 wherein said predetermined distance is about 6 inches.

5. The device of claim 1 wherein the distance from said top end to said bottom end of said plurality of side wall portions is from about 18 inches to 4 feet.

6. The device of claim 5 wherein the distance from said top end to said bottom end of said plurality of side wall portions is about 18 inches.

7. The device of claim 1 wherein said plurality of pores has an average diameter of between about 0.001 inches and about 0.004 inches.

8. The device of claim 1, wherein said wall of said hose has a substantially uniform porosity throughout a thickness of said wall.

9. The device of claim 8, wherein porosity of said wall has a uniformity of at least 90%.

10. The device of claim 1, wherein said hose includes an air impermeable portion extending in a longitudinal direction along a length thereof.

11. The device of claim 10, wherein said air impermeable portion is in the form of a stripe having a width between about 0.10 inches and 1 inch.

12. The device of claim 1, further including a hose support member disposed within said hose and extending at least the entire length thereof, said hose support member being sufficiently rigid so as to prevent sagging of said hose.

13. The device of claim 1, wherein said plurality of hose portions is distributed substantially evenly along said bottom portion of said housing.

14. The device of claim 13 wherein the distance from a center of one of said plurality of hose portions to an adjacent one of said plurality of hose portions is from about 1 to 5 inches.

15. The device of claim 14, wherein the distance from a center of one of said plurality of hose portions to an adjacent one of said plurality of hose portions is about 2 inches.

16. The device of claim 1, wherein said gas supply pipe forms a rectangle having a first side and a second side, each of said plurality of hose portions being affixed at a first end thereof to said first side of said rectangle and at a second end thereof to said second side of said rectangle such that the gas can flow into said hose from said gas supply pipe at both the first end and the second end of said plurality of hose portions.

17. The device of claim 1, wherein said means for supplying gas to said gas supply pipe comprises a blower, said blower being mounted on said housing and located outside of the liquid medium.

18. The device of claim 17, wherein said blower is connected to said gas supply pipe by a flexible hose having a first end and a second end, said first end being affixed to an outlet portion of said blower and said second end being affixed to an inlet portion of said gas supply pipe.

19. A device for the aeration and circulation of a liquid medium having a surface comprising:
 a housing adapted for flotation within the liquid medium such that a top portion thereof remains above said surface of the liquid medium, said housing having a substantially open bottom having a predetermined area, a top portion, and an open side portion having an area substantially corresponding to said predetermined area of said open bottom, said open side portion extending substantially continuously from said substantially open bottom to said top portion adjacent to said surface of said liquid medium, and a plurality of side wall portions having a top end and a bottom end thereby defining a substantially open interior portion defined by said plurality or side wall portions of said housing;
 a plurality of hose portions affixed to said bottom portion of said housing substantially parallel to the surface of the liquid medium thus providing an array of hose portions, said array of hose portions having a wall with a plurality of pores formed therein spaced apart substantially evenly throughout a length of said hose, each of said plurality of side wall portions including an open area in said plurality of side wall portions below the surface of said liquid medium for permitting said liquid medium to flow therethrough whereby said liquid medium can be caused to flow into said substantially open bottom and directly out of said open side portion of said housing to create a substantial circulation of said liquid medium;
 a gas supply pipe affixed to said substantially open bottom of said housing; and
 means for supplying a gas to said gas supply pipe.

20. The device of claim 19 wherein said bottom end of at least one of said plurality of side wall portions is spaced a predetermined distance from said plurality of hose portions, providing said open area therein.

21. The device of claim 20 wherein said predetermined distance is from about 6 to 24 inches.

22. The device of claim 21 wherein said predetermined distance is about 6 inches.

23. The device of claim 20 wherein the distance from said top ends to said bottom ends of said plurality of side wall portions is from about 18 inches to 4 feet.

24. The device of claim 23 wherein the distance from said top ends to said bottom ends of said plurality of side wall portions is about 18 inches.

25. The device of claim 19 wherein said plurality of pores has an average diameter of between about 0.001 inches and about 0.004 inches.

26. The device of claim 19, wherein said hose is formed from thermoset polymer particles distributed within a matrix of a thermoplastic binder material.

27. The device of claim 26, wherein said thermoset polymer particles have a mesh size of between about 10 and 200.

28. The device of claim 19, further including a hose support member disposed within said hose and extending at least the entire length thereof, the hose support member being sufficiently rigid so as to prevent sagging of said hose.

29. The device of claim 19, wherein said plurality of hose portions is distributed substantially evenly along said bottom portion of said housing.

30. The device of claim 29 wherein the distance from a center of one of said plurality of hose portions to an adjacent one of said plurality of hose portions is from about 1 to 5 inches.

31. The device of claim 29, wherein the distance from a center of one of said plurality of hose portions to an adjacent one of said plurality of hose portions is about 2 inches.

32. The device of claim 19, wherein said gas supply pipe forms a rectangle having a first side and a second side, each of said plurality of hose portions being affixed at a first end thereof to said first side of said rectangle and at a second end thereof to said second side of said rectangle, such that the gas can flow into said hose from said gas supply pipe at both said first end and said second end of said plurality of hose portions.

* * * * *

UNITED STATES PATENT AND TRADEMARK OFFICE
CERTIFICATE OF CORRECTION

| | | |
|---|---|---|
| PATENT NO. | : 7,954,791 B2 | Page 1 of 1 |
| APPLICATION NO. | : 11/710857 | |
| DATED | : June 7, 2011 | |
| INVENTOR(S) | : Mitchell et al. | |

It is certified that error appears in the above-identified patent and that said Letters Patent is hereby corrected as shown below:

In column 12, line 60, after "wherein" insert -- the --.

In column 13, line 45, "or" should be -- of --.

Signed and Sealed this

Sixteenth Day of August, 2011

David J. Kappos
*Director of the United States Patent and Trademark Office*